US006965886B2

(12) United States Patent
Govrin et al.

(10) Patent No.: US 6,965,886 B2
(45) Date of Patent: Nov. 15, 2005

(54) SYSTEM AND METHOD FOR ANALYZING AND UTILIZING DATA, BY EXECUTING COMPLEX ANALYTICAL MODELS IN REAL TIME

(75) Inventors: David Govrin, Herzellal (IL); Boaz Peer, Mosav Gan Haaim (IL); David Sosna, Tel Aviv (IL); Guy Greenberg, Hod Hasaron (IL)

(73) Assignee: Actimize Ltd., Petach Tikva (IL)

( * ) Notice: Subject to any disclaimer, the term of this patent is extended or adjusted under 35 U.S.C. 154(b) by 631 days.

(21) Appl. No.: 09/985,078

(22) Filed: Nov. 1, 2001

(65) Prior Publication Data

US 2003/0084053 A1 May 1, 2003

(51) Int. Cl.⁷ .................. G06F 17/00; G06F 17/30; G06F 15/173
(52) U.S. Cl. .................. 706/45; 707/2; 709/29; 709/223
(58) Field of Search .................. 706/45; 707/2; 709/26, 223

(56) References Cited

U.S. PATENT DOCUMENTS

| | | | | |
|---|---|---|---|---|
| 5,175,800 | A  * | 12/1992 | Galis et al. .................. | 706/45 |
| 6,205,471 | B1 * | 3/2001 | Gilchrist et al. .................. | 709/206 |
| 6,567,796 | B1 * | 5/2003 | Yost et al. .................. | 707/2 |
| 6,854,010 | B1 * | 2/2005 | Christian et al. .................. | 709/223 |

FOREIGN PATENT DOCUMENTS

| | | |
|---|---|---|
| WO | WO00/04466 | 1/2000 |
| WO | WO01/67303 | 9/2001 |
| WO | WO 02/103984 | 12/2002 |

OTHER PUBLICATIONS

Brobst et al; "Active Data Warehousing"—Teradata Warehouse Solutions, Dayton Ohio, Mar. 2000.
Zhuge et al; "Consistency Algorithms for Multi-Source Warehouse View Maintenance" Distributed and parallel databases, vol. 6 No. 1 1998, pp. 7-40 XP009023859 Boston USA.

* cited by examiner

Primary Examiner—George Davis
(74) Attorney, Agent, or Firm—Mark M. Friedman

(57) ABSTRACT

A system and method for collecting, filtering, analyzing, distributing and effectively utilizing highly relevant events (such as key business events) in real time, from huge quantities of data. The present invention analyzes both historic and real-time data stemming from operational activity, by interfacing with internal data repositories (such as Enterprise Resource Planning (ERP) and Customer Relationship Management (CRM)), external data sources (such as suppliers and clients), and real time operational systems in order to create an Active Intelligence Platform. This Active Intelligence Platform is positioned as a layer between the organization's data sources and its applications, monitoring inputs and relaying only the important data items to the relevant individuals and/or systems. This allows individuals and systems to respond immediately and effectively to key events.

13 Claims, 7 Drawing Sheets

SYSTEM AND METHOD FOR ANALYZING AND UTILIZING DATA, BY EXECUTING COMPLEX ANALYTICAL MODELS IN REAL TIME

FIELD AND BACKGROUND OF THE INVENTION

BACKGROUND OF THE INVENTION

1. Field of the Invention

The present invention relates to an information system for effectively analyzing and utilizing data, by executing complex analytical models in real time. Specifically, the system of the present invention describes a multi dimensional data structure that enables solving user-defined, integrated analytical rules.

2. Description of the Related Art

In recent years, advanced technologies and the expansion of the global business arena have served to intensify competition and hasten the pace in which companies need to respond to key events. The fast paced business environment has inundated the enterprise with vast amounts of operational data, which it currently has no means of exploiting in an effective and efficient manner. Clearly there is the need for companies to improve responsiveness by reducing the period between the moment a business event occurs and the moment the enterprise effectively responds.

Business intelligence systems (BI) are a broad category of applications and technologies for gathering, storing, analyzing, and providing access to data, in order to help enterprise users make better business decisions. BI applications include the activities of decision support systems, query and reporting, online analytical processing (OLAP), statistical analysis, forecasting, and data mining. Business intelligence applications include: mission-critical and integral to an enterprise's operations or occasional to meet a special requirement; enterprise-wide or local (for a single division); department oriented; project based, and centrally initiated or driven by user demand.

Data warehouse systems are central repositories for all or significant parts of the data that an enterprise's various business systems collect. Data from online transaction processing and other sources is selectively extracted and organized in the data warehouse database for use by analytical applications and user queries. Data warehousing is essential for historical data analysis and the retrospective assessment of trends.

Data mining tools are systems for the analysis of data for relationships that have not previously been discovered. Data mining results include associations between events, sequences of events, clustering or groups of events and forecasting, that can lead to predictions of the future.

However, today's business environment demands functionality that is above the scope of the above-mentioned technologies, such as the executing of real time models as part of operational process, in order to detect and respond to relevant items in real time.

There is thus a widely recognized need for, and it would be highly advantageous to have, a system or method that can enable a more effective way of collecting, aggregating and analyzing large quantities of data, in order to produce and distribute the relevant data only, in real-time.

SUMMARY OF THE INVENTION

According to the present invention there is provided a system and method for analyzing and effectively distributing large quantities of data in "real time", based on user defined analytical models.

According to the present invention, historical data can be thereby be utilized to enable vastly improved decision-making opportunities for current events. This includes handling data in ways designed to save and minimize system resources, so that key events are selected as they occur. The relevant calculations are created on the fly, and are responded to automatically, by notifying the relevant parties in a chosen way.

The components of the present invention are:
  i. A data pump layer, for capturing and loading data into the system;
  ii. A feeder component for filtering out non-relevant data and routing the relevant data;
  iii. A multi dimensional parametric data structure (MDPDS) component, for arranging and aggregating the data in the most efficient and compact way, in order to enable later analysis and rules detection.
  iv. A solver component for filtering the data from the MDPDS according to the user defined rules;
  v. a matcher component for matching and subsequently routing business events with target addresses.
  vi. A distributor component for transforming events into user readable messages.

According to the present invention, data is processed according to a process of detecting, analyzing, recognizing and targeting (hereinafter referred to as the "DART" process), as follows:
  i. Define: Data may be managed according to analytical models (a combination of rules with statistical functions) defined by users (including business people or other not-necessarily technical people). Analytical models, as defined according to the present invention, are user-defined rules that require a high level of complex analytics capabilities in order to be executed. For example, a set of rules that define a way to detect fraud in a financial transaction system, based on parameters such as client profiles, transaction volume, currency type etc.
  ii. Detect: process huge quantities of records per second from any external data source, identifying those that may be relevant and discarding the others.
  iii. Analyze: to examine the relevant records (those which passed the preliminary filtering) and to understand their impact on the values the system is monitoring.
  iv. Recognize: to match the impact of each transaction or record against the various models that had been defined by the system's users, in order to understand whether the transaction/event that took place is in fact significant to one or more people or systems.
  v. Target: If the result of the model is in fact significant, the system targets an appropriate message to the most suitable recipient or recipients (person or system) using context sensitive routing.

The present invention comprises a unique multi-dimensional data structure that enables the effective filtering, analysis, utilization and distribution of data in real time. This data structure is furthermore innovative in that it combines parameters including simple accumulators, moving accumulators and state parameters, giving the system powerful capabilities for solving complicated rules while holding a minimal set of data.

BRIEF DESCRIPTION OF THE DRAWINGS

The invention is herein described, by way of example only, with reference to the accompanying drawings, wherein.

DESCRIPTION OF THE PREFERRED EMBODIMENT

Figure 1:
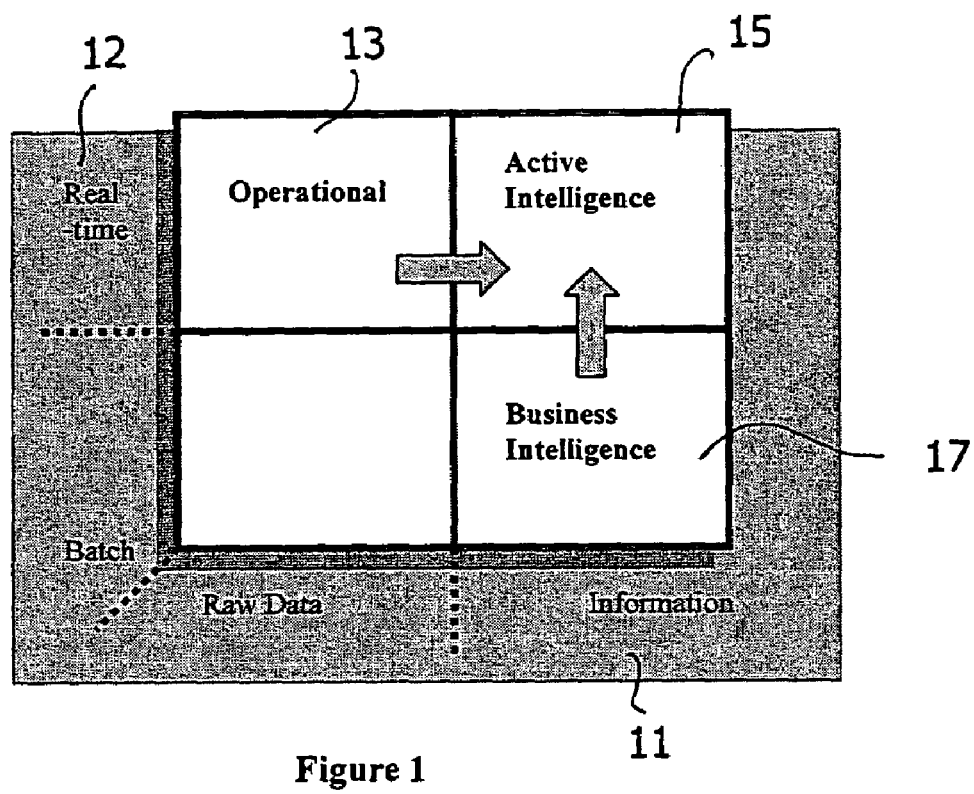
FIG. 1 is an illustration of the main functions executed by the Active Intelligence Platform.

The present invention relates to an improved means for analyzing and responding to business data, by collecting external data and executing analytical models that define and distribute key events from the data, in real time.

The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Specifically, the present invention can be used to collect, filter and analyze huge quantities of data, by defining rules to identify key events, and subsequently distributing messages or transactions related to these events, to relevant destinations in real time. "Real time", as referred to in the present document, refers to the rapid execution of requests, such that the response to a request is generated automatically by a computerized means, with no significant delay. The real time processing, according to the present invention, is differentiated from so-called "real-time" models, by not only accelerating standard analytical processes, but also adopting a new approach that divides the analytical process into phases, which are performed at the most appropriate times. This process includes both constant analyses of data and the processing of new requests, wherein the calculated data is processed against existing rules. In this way, data analysis is partially completed before particular data requests are made by the system, and furthermore, this processed/calculated data is stored in a data structure in such a way as to minimize redundant usage and processing of data, thereby substantially improving system response time and efficiency.

Market Opportunities

The next wave of the information revolution presumably lies in the automation of data analysis and business event processing. The present invention provides a platform, hereinafter referred to as "Active Intelligence Platform", which serves as a processing layer between the information in existing repositories, company-identified business events/models and raw operational data. The system allows for the recognition of critical business events as they occur and the automated activation of a pre-prescribed response, including notification of individuals and systems within the enterprise or externally (such as clients and suppliers).

Traditionally, business goals are achieved when managers and decision-makers correctly analyze and respond to performance data, customer related information, market conditions and other data relating to a variety of critical variables. The analysis of crucial information generally includes the determination of relevant segments, the study of details, the creation of action items, policy and strategy, and the designation of teams for implementation.

Today's fast paced business environment renders this traditional approach obsolete. There simply is not enough time to process huge volumes of information and still react in a timely and competitive manner. In a business world where competition is only a call away and consumer loyalty is earned anew every day, the ability to understand market events—and react to them swiftly—defines the difference between a market leader and companies that lag behind.

The present invention offers an automated, proactive approach, which enables companies to automatically locate relevant data items, convert them into action items and deliver them quickly to the appropriate people or systems within the enterprise for rapid implementation. The Active Intelligence Platform of the present invention, together with its corresponding applications for marketing, measurement, risk management and dynamic customer interactions, provides a single resource for event detractions and action item distribution.

As enterprises move to adopt operational analytic solutions (such as Analytic CRM, Work Flow, and Rule Based Systems) to support operational processes, they are increasingly finding that implementing such solutions presents significant challenges. In particular, existing enterprise data infrastructure is poorly suited to efficiently retrieve and deliver the data that operational analytic systems rely upon for optimal effectiveness. Effective use of information to control operational processes enables superior execution and can become a key competitive advantage. Real-time operational analytics deliver 'Hard ROI', in the form of measurable revenue gains and cost savings, but to realize the full potential of such systems requires a new approach to data management and analysis.

The principles and operation of a system and a method according to the present invention may be better understood with reference to the drawings and the accompanying description. Note that these drawings are given for illustrative purposes only and are not meant to be limiting, wherein:

As can be seen in FIG. 1, since the contemporary business environment demands the identification of specifically selected key events as they occur, the present invention analyzes both historic 11 and real-time 12 data, stemming from both operational activity 13 and Business Intelligence 17. This is achieved by interfacing with both internal data repositories (such as Enterprise Resource Planning (ERP) and Customer Relationship Management (CRM)) and external data sources (such as suppliers and clients). This combination results in the creation of Active Intelligence 15, wherein key business information is generated and distributed to the relevant people or systems in real time.

Figure 2:
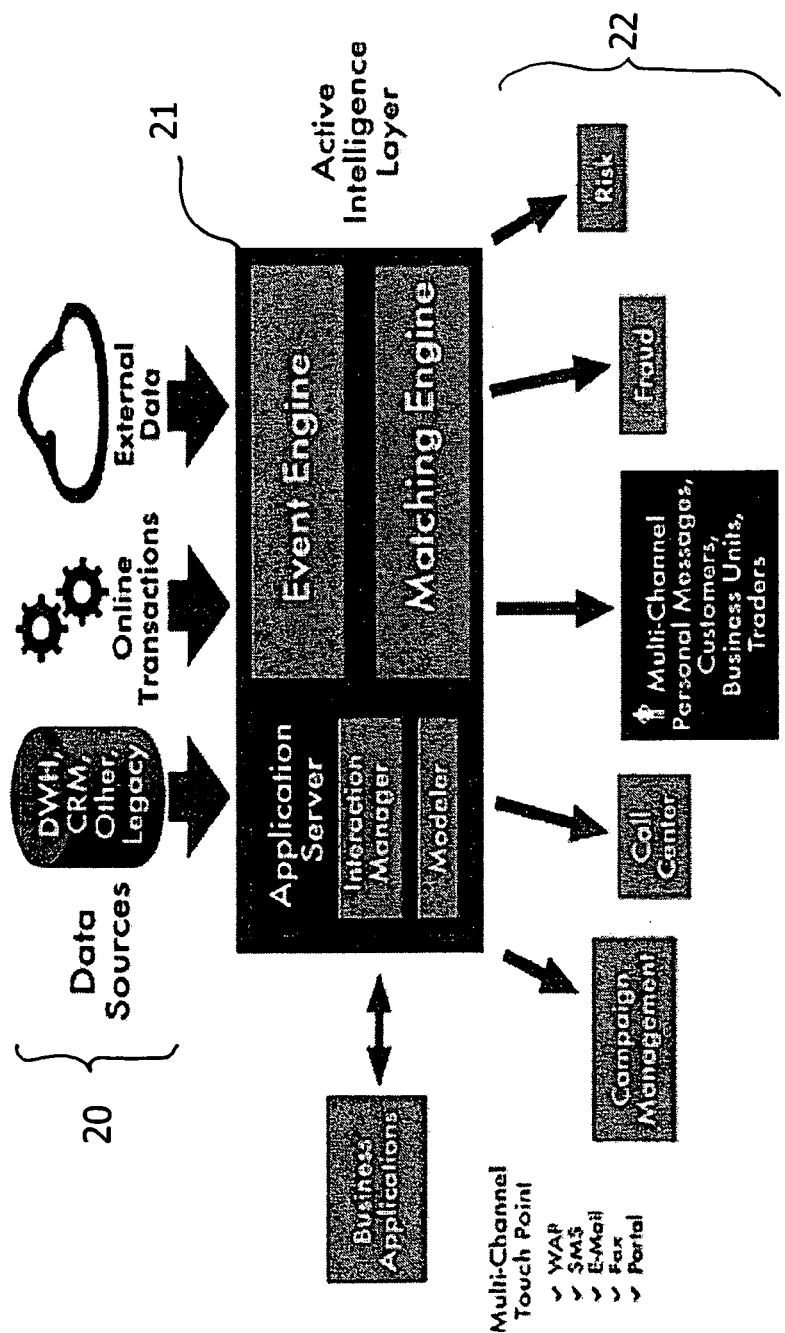
FIG. 2 is an illustration of the positioning of the Active Intelligence Platform in an enterprise information system.

The new approach provided by the present invention can be further seen in FIG. 2. Rather than querying the raw data, the 'Active Intelligence Platform' 21 is positioned as a layer between the organization's 'data sources' 20 and its 'applications' 22, monitoring inputs and relaying only the important data items to the 'relevant individuals and/or systems 23'. This allows individuals/systems to respond immediately and effectively to the event. By managing the execution of real-time analytical models within operational processes, the present invention helps enterprises optimize process execution, leveraging data from a variety of transactional and historical sources to guide the optimal execution of that process.

The present invention delivers the next generation of Enterprise Analytics, supporting front line business processes and automating the information flow. The present invention empowers organizations by transforming their data into active intelligence, enabling them to continuously track key activities and proactively identify and fully exploit narrow windows of opportunity for value creation.

The Active Intelligence Platform, according to the present invention, is an enterprise-wide software platform that enables large organizations to move beyond the traditional passive reporting and analysis concept, and embrace the continuous tracking and reacting to key business events within their operational processes, such that:

i. Within the mass of enterprise data, only certain items require a response.
  ii. Active Intelligence enables enterprises to automate the process of finding those items and taking immediate action in response.
  iii. Active Intelligence utilizes detailed, micro-level analyses that is highly time-sensitive and targeted, based on user-defined business events.

In order to integrate with the organization's existing data repositories, Active Intelligence constantly monitors every single transaction and automates core business processes by directly tying them to relevant data. This real-time transmission of data allows organizations to be aware of all aspects of operations at all times, and to respond quickly and precisely to all operational exceptions.

The Active Intelligence Platform of the present invention provides advanced notification by analyzing large volumes of data from multiple sources in real-time and connecting the pre-determined relevant information with dedicated recipients for rapid and effective response to critical business events. Active Intelligence enables the following features:

Flexibility—a quick and easy process to define and manage complex business scenarios.

Efficiency—retrieval of highly relevant information from multiple sources at varying levels of aggregation. Critical information is furthermore stored and utilized in an improved way, such that redundant usage of information is avoided, and a more efficient means of processing queries is enabled.

Performance—real-time interaction with large volumes of data from a variety of repositories, representing volumes of business events.

Delivery—focused, targeted delivery of action items to the specific individuals or systems via in-context distribution.

As competition increases and enterprises adapt their business models to maintain a competitive edge, business information infrastructure is recognized as a key element for success. Implementing the business intelligence platform of the present invention, Active Intelligence, enables an enterprise to utilize its existing data resources to coordinate decision-making across the enterprise and achieve the following:

Optimization of operational processes, including operational savings and control, automated implementation of business strategies, and accurate and timely performance evaluation and feedback.

Effective reaction to "business events" as they occur, including identifying new opportunities for revenue generation; enabling business units to control rule/event definition; and routing action items in accordance with context for optimal response.

Effective usage of the Enterprise's data resources, including finding important events/opportunities in massive volumes of data; integrating Real-Time transaction data with corporate databases; placing only a minimum load on existing data sources; and gaining rapid implementation without data replication.

Generate incremental revenues, including the creation of new Revenue Models, such as history-based and event-driven pricing models; and developing New Products, while allowing customers to tailor "product parameters".

DETAILED DESCRIPTION OF THE PARTS

Figure 3:
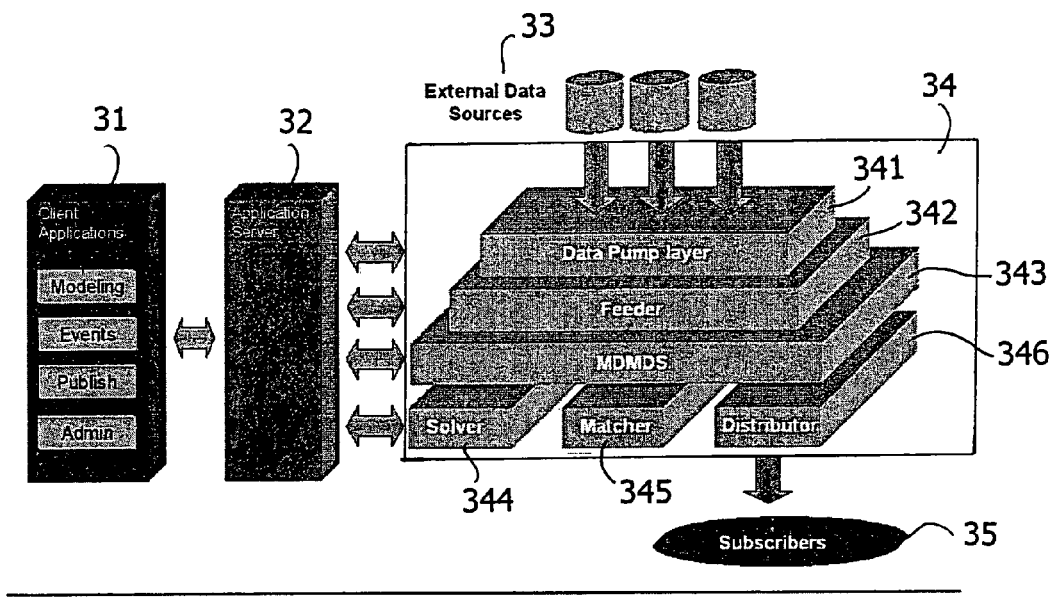
FIG. 3 is an illustration of the main components of the Active Intelligence Platform.

The present invention, referred to as the Active Intelligence Platform 34, can be seen in FIG. 3. It is located between the application server 32 and external data sources 33, and is comprised of the following components:

i. A data pump layer 341, for capturing and loading data into the Platform 34, from various external data sources 33;
  ii. A feeder component 342 for filtering out non-relevant data and routing the relevant data to the platform;
  iii. a MDPDS (multi dimensional parametric data structure) component 343, for arranging and aggregating the data in the most efficient and compact way, in order to enable later analysis and rules detection.
  iv. a solver component 344 for analyzing the data stored in the MDPDS 343 according to user defined rules;
  v. a matcher component 345 for matching business events with target addresses.
  vi. a distributor component 346 for distributing/routing business event information to the relevant sources/addresses in real time, such that events are transformed into user readable messages or machine operations/transactions.

Figure 4:
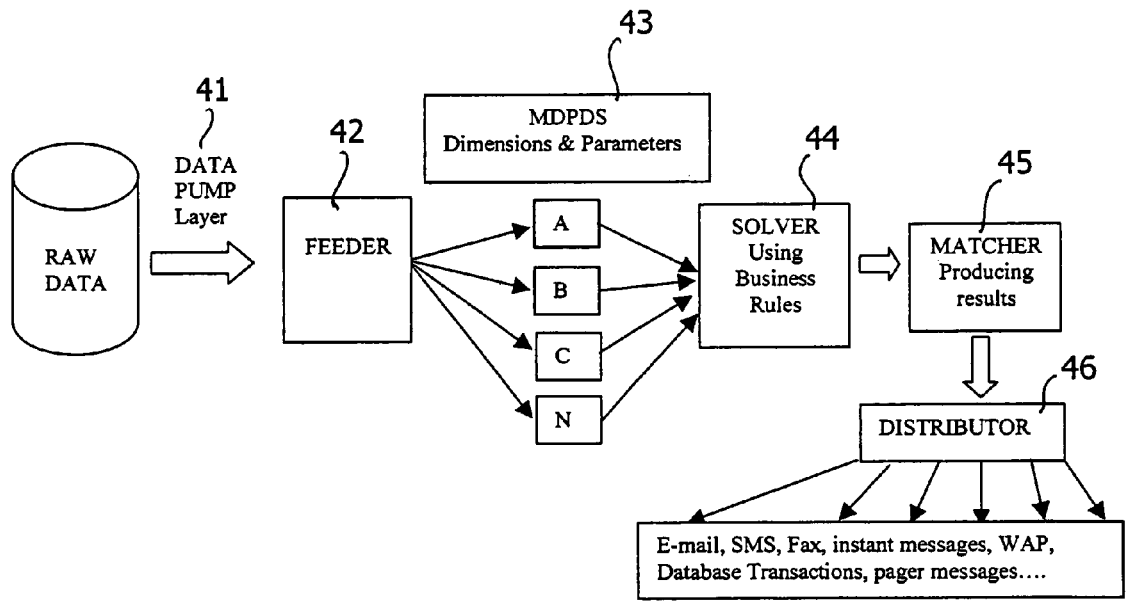
FIG. 4 is an illustration of the basic components, according to the present invention, and how they operate together.

The components of the Active Intelligence Platform 34, as further illustrated in FIG. 4, are enabled as follows:

i. The Data Pump Layer 41:

The data pump layer is where external data is captured and loaded into the system from various data sources. Two basic types of data pump components are currently available: Loaders & Listeners. Loaders are system specific drivers that load static data from external sources such as relational databases and flat files on request. Listeners are system specific adaptors that capture external messages from different messaging systems, such as IBM's Mqseries. Listeners capture messages, such as email, chat, instant messaging, online transactions and other data streams, and transform them into discrete data elements in real-time.

ii. The Feeder Component 42:

The feeding layer is responsible for filtering out the non-relevant data, and routing the relevant data into the appropriate MDPDS objects (dimensions and parameters, described below). Some pre-storage analysis is done in the feeder, such as simple calculations of data that don't exist in the source data but can derived directly from it, in order to enrich the raw data. For example, the feeder component may calculate the value of an object or service out of price and quantity, concatenating several fields together, or slicing a specific field and taking only part of it. The feeder determines what the relevant data is by applying filters over the raw data. Filters are logical expressions (such as true/false) defined by the user for each event. The rules configured for the feeder may be business or other rules (like those rules used by the Solver), which are hereinafter defined as "Filtering Rules". These rules are typically simple, logical rules for initially filtering raw data. (These rules can be contrasted with the rules used by the Solver, which are hereinafter defined as "Analytical Rules", which are typically more detailed and complex.) The Feeder may combine various Filtering Rules in order to find the minimal necessary set or required data to route to the MDPDS component. Two types of filters are currently available: The first one is a simple logical expression, or "Logical filter", which is evaluated for every row. For example, all transactions are evaluated in order to determine which transactions are for higher amounts than $1000. The second one is a "Dimensional filter". For example, all the transactions of customers who are more than 65 years old. This type of filter is pre-processed and all the relevant accounts are marked, so that during the data loading process (when loading raw data into the system using the Data Pump layer), there is no need to check each transaction for the account owner's age, and then determine if the age is greater than 65. Instead, it is only necessary to logically filter the relevant accounts, as were marked in the pre-process stage. This filtering system is substantially more efficient than logical filters in terms of performance. In this way, the Dimension filtering is not executed during the load process (a task which requires relatively significant resources) but is pre-processed. The Dimension filtering is evaluated on a one-time basis over the dimensions, creating a bit-map structure for each event (actually for each parameter). This bit-map structure is thereafter detected during the load process. Such a detection of bit-map structures is a task that requires much fewer resources and consumes much less time that traditional means by which a system processes data during the load process. Filtered data is subsequently routed to the MDPDS 43.

iii. The MDPDS Component 43:

The MDPDS component (multi dimensional parametric data structure) 43, according to the present invention, is a multi dimensional data structure designed and optimized to hold the minimal set of data necessary to solve pre-defined integrated analytical rules in an efficient way. Such efficiency is achieved by dividing the data into two types of elements: descriptive (dimensions) and quantitative (parameters), as determined by the user. Parameters are accumulative in nature and hold only the most recent and updated data. For example, in the case where a customer's bank account information is being processed, it is only necessary to calculate the impact each new account event has on the customers balance, and store this balance, as opposed to storing all transactions data. Parameters are therefore not required to keep raw data, which enables a dramatic decrease in required system resources. Each of these elements is represented in a different way, in order to optimize the MDPDS's role in solving the analytical rules. This categorizing/normalizing of user data into various dimensions ensures that user data is normalized and remains updated at any given time.

These two main types of objects, or data elements, Dimensions & Parameters, are stored within the MDPDS, and are described in more detail below:

Dimensions are hierarchic hash indexed tables, which generally hold descriptive information about the analysis dimensions.

Parameters are business accumulators that are wrapped in a multi dimensional indexing cover and hold logic that describes the way they are updated and the type of data they hold.

iv. A Solver Component 44:

The solver component utilizes the data stored in the MDPDS to solve the user-defined rules in the most efficient way. These rules are typically analytical expressions, hereinafter referred to as "Analytical Rules", defined by the user to define business and other rules. These rules combine parameters and dimension attributes from the MDPDS. An example of such a rule is "the sum of deposits over the past 3 days is greater than 3 standard deviations of the weekly deposits during the past 6 months". The solver interfaces with the MDPDS and fetches the relevant data from the MDPDS, according to defined rules. These defined rules are configured by users and stored in a Data Repository. This repository is a data structure designed to meet the application needs, and is implemented in a standard relational database (e.g. Oracle, SQL server, etc.).

The calculation of the analytical expressions (rules) after the data is available is done by a Parser. The Parser, which is a component known in the art, is a global component, which is used by all of the other components of the system. It provides the other components with the ability to perform calculations, by parsing the rules and expressions indicated by the user, and gathering the data required to solve the expressions or rules from the MDPDS or any other source.

v. A Matcher Component 45:

The matching component, according to the present invention, comprises a Matching Engine. The Matching Engine uses both external and internal definitions of organizational structure, customer lists and other potential sources of recipients, such as the organization exchange address book, in order to prepare, in the most focused way, the relevant triggers/messages to the targeted recipient ID's.

Matching is done through communities, which can be defined in at least two basic ways:

Small hierarchical communities—hierarchical communities built in the system in the form of an organization chart. Each branch in the tree represents a function in (or out-of) the organization. This type of community is generally used if the community is heterogeneous in terms of context attributes.

Dimension based communities—communities that are based on pre-defined dimensions like customers, organizational structure, etc. They are flat (not hierarchical) and are often relatively large (up to millions of subscribers). This type of community is used in homogenous communities.

In Hierarchical communities, recipients are attached to the nodes of the organization structure, while in Dimension Based Communities, each dimension member represents a recipient. The Hierarchy of the community can be utilized, for example, for sending messages to managers in case certain thresholds are exceeded, via a rule triggered to the manager's subordinate.

Each node in a hierarchical community includes properties that are used by the matching engine. These properties are definitions of filters over dimensions. For example: a branch manager will have a filter over the organization structure dimension that includes only his/her branch. In this example, the matching process automatically attaches at least one recipient ID to the result, such that all messages regarding this particular branch are prepared for sending to the manager. The hierarchic structure is utilized to inherit these definitions downstream in order to simplify the definition procedure. Of course, additional tuning can be done in order to reduce the amount of messages per recipient by routing the messages downstream to its subordinates, according to their domain specialization.

With Dimension-based communities, filtering is executed automatically because recipients are dimension members, and the results are routed to them only if they are defined as relevant by the dimensionality of the triggered event.

vi. A Distributor Component 46:

The Distributor component transforms events into human readable messages (by using pre-defined templates) and distributes them to their recipients by various mediums, such as E-mail, SMS, Fax, instant messages, WAP, Database Transactions, pager messages etc., as defined or configured by the data receivers. Configuration of such a distributor component is known in the art, and may be configured by an administrator who is familiar with the external distribution devices.

Detailed Description of the Process

The present invention provides a means for analyzing massive volumes of data, enabling the recognition of patterns that match predefined events, and delivering actionable messages to the relevant recipient, whether inside or outside the organization, that is best suited to respond to the event. These means are comprised of several stages, including detecting, analyzing, recognizing and targeting, which are hereinafter referred to as the "DART" Methodology. The DART methodology utilizes the Active Intelligence Platform of the present invention, and is differentiated from data management technologies known in the art by several unique capabilities:

- Business rule driven—non-technical users can easily interface with the GUI of the present invention, to input sophisticated decision rules.
- Multi-source—connects the Active Intelligence Platform directly to any existing data systems and enables interaction with these various data sources simultaneously.
- Dynamic aggregation—each data element is evaluated only once. The system of the present invention retains a record of the "effect" of each element on the decision rules, allowing Active Intelligence to incorporate data that has been drawn from the system in its rules.
- Highly scaleable—able to evaluate a multitude of complex, inter-related rules simultaneously over a huge quantity of transactions per second, in real-time.
- Targeted delivery—delivers actionable messages directly to the most suitable recipient/s, based on defined rules and/or organizational hierarchy.

Figure 5:
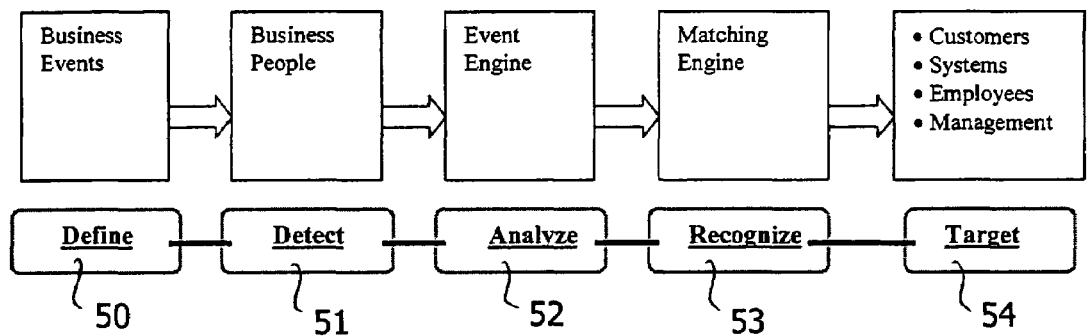
FIG. 5 is an illustration of the DART process, according to the present invention.

The DART process, as can be seen in FIG. 5, includes processing data according to the following steps:

i. Defining 50: to manage data according to events or rules defined by business or other not-necessarily technical people. Such events may be defined according to business policy and objectives.

ii. Detecting 51: to monitor transactions, events and changes of relevant data in multiple legacy systems, and process huge quantities of records per second from these data sources. This requires identifying those records that may be relevant and discarding the others.

iii. Analyzing 52: to examine the relevant records (those who passed the preliminary filtering), using an event engine, which is known in the art, in order to understand their impact on the values the system is monitoring. This analysis includes sorting, aggregating and storing of high value data items in the MDPDS data structure, with embedded business rule logic.

iv. Recognizing 53: to identify and recognize business events using complex formulas based on pre-calculated aggregations and states (rules) that have been defined by the system's users. This step, carried out by a matching engine, enables the platform to understand whether an event that took place is in fact significant to at least one person in or out of the organization.

v. Targeting 54: If the event is in fact significant, the system matches and delivers the appropriate message to the most suitable recipient/s (managers, employees, customers, systems) using context sensitive routing.

In Greater Detail, the DART Process Consists of:

1. Define: Data management may be determined by the definitions and rules provided to events, by business people (not-necessarily technical people). For example, a company using the present invention may define rules governing all incoming messages, such that every incoming message is scanned by Norton anti-virus software. In this case, this rule will play a part in the management of all incoming messages.

2. Detect (D): Monitors transactions, events and relevant changes in the enterprise information environment.

The Detect phase processes huge quantities (at least thousands) of records per second from any external data source, identifying those that may be relevant and discarding the others. The data is streamed into the system in two main forms: Static data (like relational databases), which is read by the "Loader" which processes SQL queries from the database. These queries are automatically generated by the system according to the required data sources and the necessary collection of fields. Dynamic data sources, like queues (such as MSMQ), which are fed on-line by the external systems, are processed by the "Listener". The "Listener" is an active component that receives messages from the queue, and streams the messages into the system. Both the "Loader" and the "Listener" perform preliminary filtering operations based on all the rules being solved, and discard all records or messages that are not relevant to any of the rules. The decision of which record/s is relevant to which rule is done during the next phase.

When dealing with relational data sources, an SQL generator, which is part of the Data Pump Layer, generates SQL queries over relational databases according to the defined rules and filters. This SQL generator is able to create filters (WHERE conditions) on the SQL queries, so that considerable network traffic is saved by avoiding non-relevant records. Again, these WHERE conditions are generated after taking into consideration all of the rules being solved at that time.

The Active Intelligence server is able to process massive quantities of records per second from both batch and on-line data sources.

Two types of raw data are streamed into the system:

i. Batch data sources, such as relational databases, are read by the "Loader" component, which processes SQL queries over the databases. These queries are automatically generated by the system according to the required data sources and the necessary allocation of fields.

ii. Online data sources, such as on-line feed queues (i.e. MSMQ) from external systems, are processed by the "Listener". The "Listener" is an active component, which streams received messages from the queue into the system.

Both the "Loader" and the "Listener" perform a preliminary filtering operation according to pre-determined rules requirements. All records or messages, which are not relevant to any of the rules, are discarded by the system at the filtering stage.

When dealing with relational data sources, the unique SQL generator performs automatic creation of filters on SQL queries, thus dramatically reducing network load, and disregarding irrelevant data. The determination of which data element is relevant to which rule can be performed either at the server or the client end.

3. Analyze (A): Performs analytical processes and calculations over data according to set business rules:

The Analyze phase's task is to examine the relevant records (those which passed the preliminary filtering) in order to understand their impact on the values the system is monitoring (e.g. a Withdrawal would effect values such as customer balance, number of transactions that month, total withdrawal in the branch etc.). These monitored values are called "Parameters" and their details will be discussed later in the section dealing with Multi Dimensional Data Structure. Each record is routed to all relevant parameters, and the value of that parameter is changed according to a specific logic embedded inside the parameter. (e.g. The withdrawal transaction will effect each one of the previously mentioned parameters. The transaction amount will be subtracted from the customer balance, the number of transactions this month will be increased by one, and the transaction amount will be added to the total withdrawal in the branch). Parameters can be common to many rules and still stored and updated only once.

At this phase, the system examines the data that passed the preliminary filtering to understand its impact on the values or parameters that the system is monitoring. For example, in the banking sector, a withdrawal would be seen as affecting parameters such as customer balance, monthly transactions, total withdrawal at the specific branch and others.

Each record updates all relevant parameters, changing its value in accordance to the event. Keeping with the example from the banking sector, the stated withdrawal would result in a recalculation of the customer's balance, the number of transactions in the bank branch, and the total number of withdrawals. The Active Intelligence platform allows for parameters to be common to many rules, but these parameters are stored and updated only once, minimizing their impact on system resources.

4. Recognize (R): Identifies the occurrence of business events according to set business rules. The Recognize phase's task is to match the impact of each transaction or record against the various rules that had been defined by the system's users, in order to understand whether the transaction or event that took place is in fact significant to at least one person in or out of the organization. The recognition is done either on-line as each transaction is streamed into the system, or at the end of the pumping process, as all the parameters are totally up to date. The rules are defined and evaluated against three basic type of values: The monitored values (parameters), additional attributes of the dimensions involved (e.g. credit limit of the customer, expiration date of the campaign, etc.) and any other additional information that exists anywhere in the information systems of the organization, and can be accessed directly by the system.

The recognition phase utilizes the relevant information analyzed by the system during the previous stage, and measures the impact of that transaction/record against the list of user-predefined rules, in order to assess its significance as an event. The recognition is done either online as each transaction is streamed into the system, or following the pumping process.

5. Target (T): Matches and delivers action items to designated targets (managers, employees, customers, systems).

In the event that the Active Intelligence Platform reaches the conclusion that certain operational data indicates the occurrence of a monitored event, the platform triggers the distribution functions, sending the message to the most relevant individual/s or system/s (internal or external to the organization), as predefined by the organization. Significant events are thereby targeted in appropriate message to the most suitable recipient/s using context sensitive routing. The routing is done by the "Matching Engine" which compares the context of each triggered event with the context attributes of each member of the communities attached to that rule.

According to this context sensitive routing, the Active Intelligence Platform understands context in means of comparing the dimensions and attributes of the event to the attributes of the communities and the filters defined for the subscribers. (i.e. if the event is an important reaction of a customer to a new product, then the dimensions of the event are the customer and the product and the attributes might be all the attributes of the specific customer or specific product). This "Matching" is done in an efficient way that can handle communities containing millions of members. A detailed description of the "Matching" process will be given later in the section dealing with the "Matching Engine".

After the matching is done, the "Distribution Engine" is in charge of turning the event into action message. This can be done in several ways: Short messages can be generated by using pre-defined templates, and sent to the recipients via a various communication channels like e-mail, fax, instant messaging, paging, SMS, etc. More complex and designed reports containing tabular enriched information can also be generated on a template basis and distributed via the same channels (SMS might not be a good solution for such reporting model). The triggered events not only generate messages, but also create triggers and generate transactions in external systems by pre-defined definitions.

All the decisions made and actions taken by the system are fully archived for later follow-up and monitoring.

Multi-Dimensional Parametric Data Structure

In order to manage the various accumulators and variables, the present invention comprises techniques to generate and manage a multi-dimensional data structure that performs the tasks described in the previous section. The importance of multi-dimensionality is attributed to its generic and business oriented approach to defining business parameters and event rules. The dimensions, levels and hierarchical structure are more natural to the business user then relational terms such as tables and joins. The multi dimensional structure is analysis oriented, enabling application of rapid slicing, filtering and aggregation operations.

Although these operations are not performed by the user through ad hoc queries as in many OLAP systems, the Active Intelligence platform utilizes them throughout the DART process. The Multi-Dimensional Parametric Data Structure has the following attributes:

1. Fast access to each variable at each aggregation level. Furthermore, the MDPDS holds only analyzed accumulators, and not raw data.
2. Fast load/update capabilities, enabling on-the-fly analysis operations, and online and incremental update capabilities.

Standard relational databases (RDBMS such as Oracle, MS SQL Server or similar) will not be suited to fulfill these requirements since they will not meet performance standards in terms of access speed and on-the-fly analysis capabilities. Such kind of platforms also cannot embed logic in an efficient way, and therefore require doing the calculations outside, before the update, in a time consuming operation.

Standard industry multi-dimensional database engines (MDDBMS such as Oracle express, MS Analysis server, TM1 and similar) also lack support for embedded logic, and most do not enable online updating. Most multi-dimensional databases store all or a large amount of the possible aggregations in advance in order to accommodate unpredictable queries. This method is often a waste of enterprise resources and time. In contrast, the business environment, according to the present invention, enables a vastly more efficient means of processing data, where all rules are known in advance. These rules enable the system to store processed data only, as opposed to raw data, thereby causing substantial improvement in a system's resource usage, and substantial improvement in a system's ability to process new requests.

The two main components of the structure are "Dimensions" and "Parameters". Dimensions are hierarchic hash indexed tables, which generally hold descriptive information about the analysis dimensions. Dimensions are optimized to enrich the data available to the rule definers, and to supply the ability to drill up and down the hierarchies in order to perform aggregations and filtering. Dimensions are a common concept within the field of multi dimensional databases. An example of a Dimension is time, customers, products, etc. Dimensions are structural attributes of transactions or other data streams, and are organized in categories (levels) and sub categories (attributes) that describe data in the fact streams. These levels and attributes describe similar sets of members upon which the user wants to base an analysis. Levels might be organized in one or more hierarchies. For example; the "Accounts" dimensions will include, for example, the levels: Account, Customer, Cluster, Branch, Region, Unit, Wing, etc. The "Customer" level, for example, includes the attributes: Customer ID, Customer name, etc. Optional hierarchies are, for example, Account-Customer-Branch, Account-Cluster-branch-Region, etc. Dimensions are represented as hash-indexed objects with extremely fast access capabilities, as well as navigation abilities up and down the hierarchies.

"Parameters" are business accumulators which are wrapped in a multi dimensional indexing cover, and hold, in addition to simple data, a logic describes the way they are updated and the type of data they hold. Parameter definition is currently made up of three main parts:

Data Definition: Definition of the data which represents the atomic information items to be aggregated (transaction amount, price, quantity, price*quantity+V.A.T. etc.).

Aggregation type & level: Describe how data is aggregated (sum, average, min, max, variance, etc.) and to what level (account, customer, cluster, branch, etc.).

Filtering: Describe which data items are relevant (for example, only deposit transactions, only yesterday's withdrawals of private banking customers, etc.).

Parameters are represented as multi dimensional hash indexed objects with fast access and on-the-fly analysis capabilities. Indexes are built automatically by the Active Intelligence Platform, after analyzing the specific analysis requirements of the current set of pre-defined rules. These parameters are multi dimensional data structures, which currently hold three types of accumulative data: Simple accumulators, Moving accumulators and State parameters. These three types cover most of the analytical needs of such a system.

Figure 6:
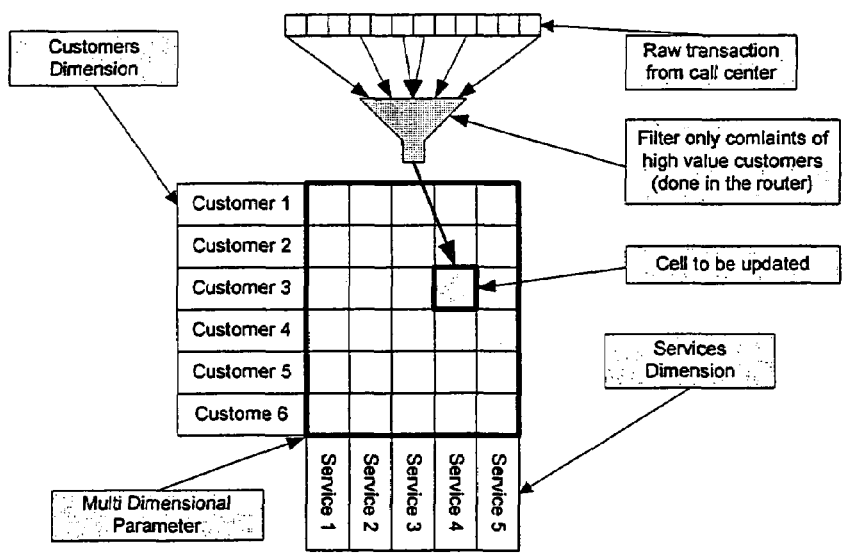
FIG. 6 is an illustration of a simple Accumulative Parameter.

In order to explain the concept of parameters, some examples will be used: Parameters are the basic stones which rules are built upon. In some cases (usually relevant to state parameters) the parameter represents a complete rule. A typical parameter in the international telephony curriers industry, for example, might be: Alert the relevant account manager whenever one of its high value customers have placed a third complaint call to the call center regarding a specific service. In order to accomplish this rule we must define a Simple accumulative parameter that holds the total number of complaints for each customer and service. We might think of it as a two dimensional matrix with a filter in the entrance, as can be seen in FIG. 6. Each cell in the matrix in this example is a counter, which counts the inserted transactions. Simple accumulators might implement many other types of accumulative functions such as: Sum, Max, Min, Average, Variance, Standard deviation, First, Last, etc. The important issue is that no raw data is maintained because the rules are known in advance, and the parameters are defined according to the rules requirements. The rules and parameters are defined by users (such as business users and other not-necessarily-technical users). Usually parameters are defined in advance according to general known business metrics, but they can be defined during the rule definition on demand.

A different typical rule might look like this: Send SMS or E-mail to the customer whenever he/she has made a total of more then 120 accumulative minutes of calls during a period of 3 days (for a specific destination country), and let him or her know that he/she will get a 50% discount for calls for the same country during the following 24 hours.

Figure 7:
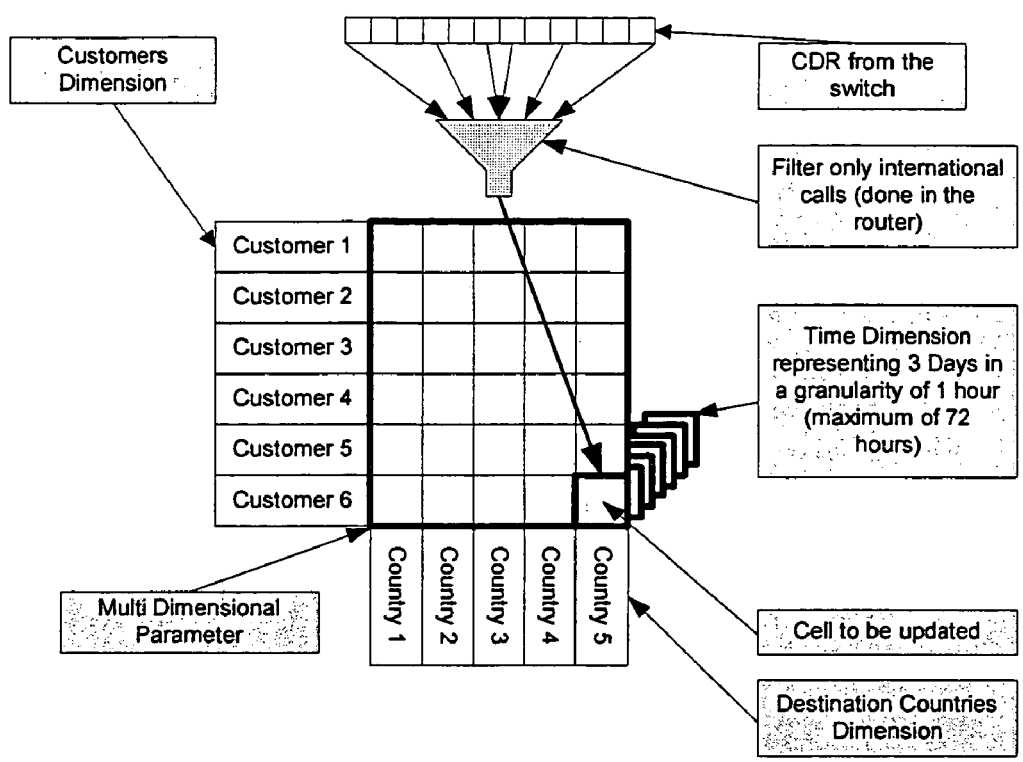
FIG. 7 is an illustration of a Moving Accumulator.

In this example, the issue of defining a 3-day period makes this type of accumulator different from simple accumulators. It is therefore referred to as a Moving Accumulator, since the accumulation is not done for all transactions, but for those that occurred during the last 3 days only, and therefore older transactions must be removed. In order to accomplish this task, a level of granularity must be defined over the time dimension, for example 1 hour. An example of the Moving Accumulator is illustrated in FIG. 7, which shows how another "dimension" is added to the matrix representing the moving "time dimension".

Figure 8:
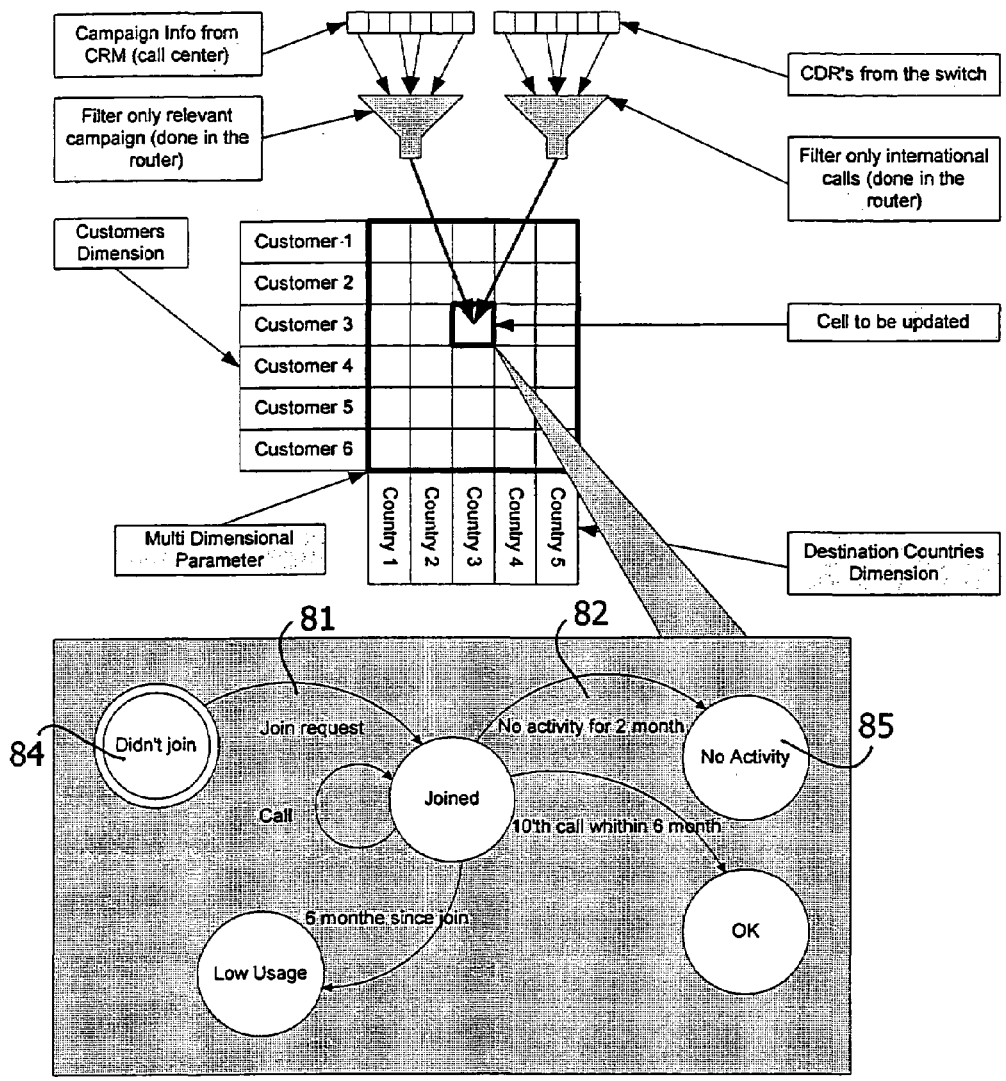
FIG. 8 is an illustration of a State Parameter.

In a further application of the present invention, different types of parameters are required to solve rules, for example: Notify a call center representative whenever a customer has joined a campaign giving him or her a discount for calls for specific destination; and a customer did not make any calls to these destinations within 2 months after joining the service, or made less then 10 calls within 6 month after joining. Since the nature of this rule is different from others rules, the nature of the required parameter is also different. In order to fulfill such a rule, a state parameter must be defined. State parameters are represented as state machines, which do not hold accumulative data, but hold information about the current state of each cell in the matrix. This is demonstrated with reference to FIG. 8, where each cell in the matrix holds the current state of the coordinate (and optionally timestamps) and the logic of transformation functions, which are represented as arcs in the state machine. FIG. 8 furthermore illustrates such a process, whereby various events, such as a join request 81 or no activity for 2 months 82 cause system alerts or responses, such as did not join 84 or no activity 85.

The combination of all three type of parameters described above, gives the system powerful capabilities for solving complicated rules while holding minimal sets of data.

Following are some additional important characteristics of the MDPDS:

i. Although the above examples demonstrate parameters of two dimensions, the actual number of dimensions can be any number from 1 and above. It is difficult to demonstrate graphically structures with more then two dimensions.

ii. The logic of how to aggregate data, and how to change the state of a state machine is embedded inside the parameter. This means that that the MDPDS is not only a storage component, but has also embedded logic, which results in better performance and modularity. The embedded logic uses parameters that serve as business accumulators, wrapped in a multi dimensional indexing cover, to hold logic that describes the way that the business accumulators are updated and the type of data they hold. The parameters are not a database, where one places data or retrieves it. Instead, the parameters include embedded logic that states what to do with the data. For example, parameters can state that the data is to be used to calculate summaries of all data items or parameters can be in the form of a state machine that can be embedded in the parameter. As a result, the addition of each new data item to the parameter will result in a change of the state of the parameter, and will not impact on the storing of the new data item (as would have been the case in a database).

iii. All structures are sparse, meaning that only existing data requires storage space.

iv. Rules might (and usually do) require several parameters, where each parameter may be of a different type.

v. Because of the multi dimensional structure, aggregations can be made on the fly very efficiently, using the dimensionality and hierarchies of the dimensions.

vi. Each parameter is independent in the way it executes updates, so data integration is very easy since rule builders do not care which source updates each parameter. Parameters and dimensions are updated behind the scenes and can be updated in either batch or online procedures.

Templates

The present invention provides templates for the design of messages and reports to enhance the delivery of customized information to specified targets. Templates are general forms of messages and reports created by the user that designs the structure of each message. Templates can be singular so that, in this case, each triggered event creates a message and is published. Alternatively, templates may be tabular, in which case triggered events are accumulated for each subscriber, and are published as a report at the end of the process. Tabular templates are generally relevant for batch processes only.

Currently supported publishing medias include:
Text messages (such as files, e-mails or SMS messages).
HTML messages (such as files, e-mails, fax, http)
XML messages (such as files, http)

Implementation

Figure 9:
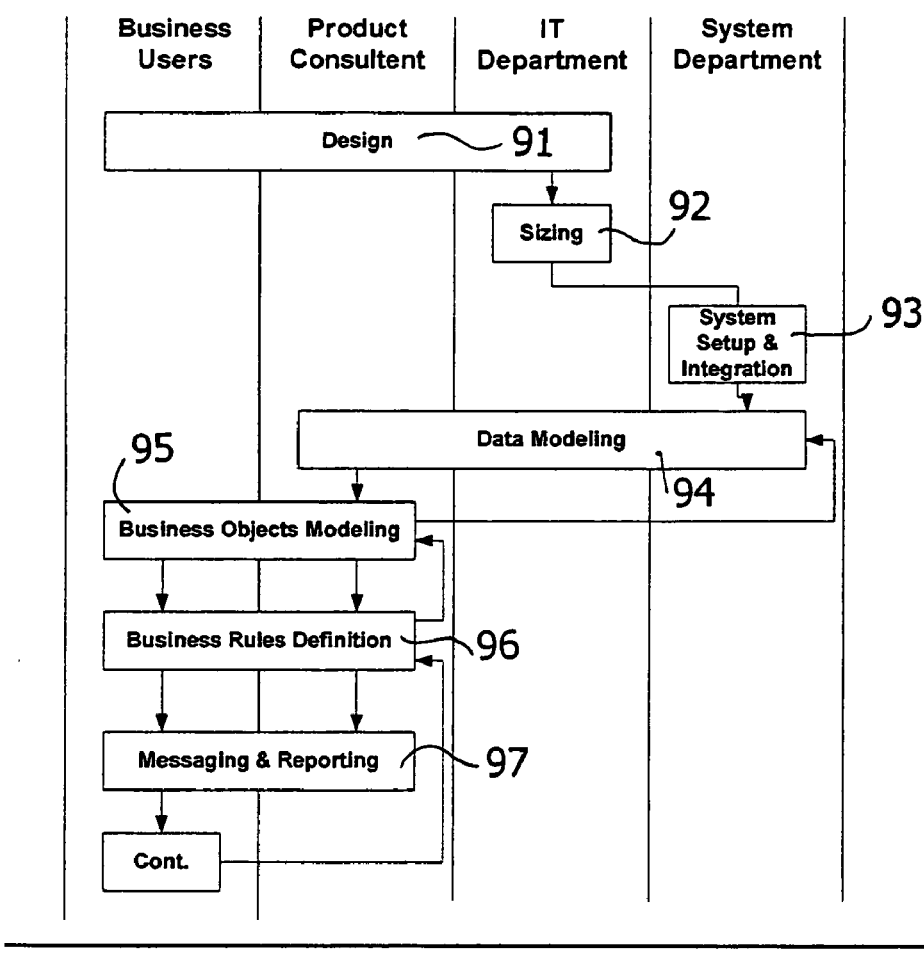
FIG. 9 is an illustration of the implementation process, according to the present invention.

The implementation methodology and practical action items are based on the Active Intelligence platform implementation model, which is divided into several phases, as can be seen in FIG. 9:

(1) A preliminary Design process 91, where business needs are defined against product scope and data availability in the enterprise IT systems;

(2) a Sizing assessment 92 is done by estimating the complexity and volume of the specific project in terms of hardware, communication and software specifications;

(3) the installation of the Active Intelligence platform and applications, as well as additional necessary system integration elements, is done at the System Setup & Integration phase 93;

(4) during the Data Modeling process 94, business models and dimensions are created and mapped to the external IT environment. After the business models are designed, Business Objects can be created 95 according to desired business events, which were defined earlier during the design phase. Upon these Business Objects, Business Rules are defined 96, designed to meet specific business needs and problems; and (5) the last phase prior to the platform launch includes the definition and design of messages and reports 97, later to be used by the system for purposes of production alert and distribution to end users.

Active Intelligence Applications

Active Intelligence is a robust, scalable, real-time enterprise-wide software platform that connects existing enterprise management systems to turn transactions into actions—an enterprise automation framework that allows every transaction to be assessed for opportunity or risk.

The Active Intelligence platform acts as a base for a series of applications, delivering end-to-end solutions that address concrete core operational issues faced by large enterprises, such as:

1. Performance Measurement—calculate complex Key Performance Indicators (KPIs) to manage and guide staff and business partners in real time.

2. Risk Management—instantly implement new policies to address emerging risk scenarios and trigger preventive action.

3. Attrition Management—ability to recognize complex customer behavior patterns that indicate a high risk of attrition and initiate retention activities.

4. Marketing Optimization—identify opportunities for cross-sale and up-sale, spot incomplete sales, monitor and adjust marketing programs and channels, and execute sales in accordance with customer related events.

5. Event Driven Marketing—identify and execute sales opportunities arising from customer related events.

6. Compliance and Business Reporting—track key risk indicators in real time, and prevent policy violations.

Alternate Embodiments

The inventors contemplate several other embodiments. For example, automatic updates of customer/business events to call centers/service centers, automatic real time supply chain integration, real time calculations of hedging positions for securities firms, real time credit approval for financial institutions, optimization of processes in manufacturing industries such as optimal ordering of parts, optimized allocation of resources in the health care industry etc. These implementations are self explanatory, requiring simple implementations of the core technology described above.

The foregoing description of the embodiments of the invention has been presented for the purposes of illustration and description. It is not intended to be exhaustive or to limit the invention to the precise form disclosed. It should be appreciated that many modifications and variations are possible in light of the above teaching. It is intended that the scope of the invention be limited not by this detailed description, but rather by the claims appended hereto.

What is claimed is:

1. A platform for identifying key events from a plurality of data sources, according to user-defined rules, and delivering actionable messages of these events to a relevant target using real time analytics, comprising:
   i. a data pump layer, for capturing and loading data into the platform, from a plurality of external data sources;
   ii. a feeder component for filtering said data, and routing relevant said data;
   iii. a multi dimensional parametric data structure (MD-PDS) component, for aggregating and storing said data routed by said feeder component;
   iv. a solver component for filtering said data from said MDPDS, according to user defined rules, in order to determine events;
   v. a matcher component for matching said key events with target addresses, and transferring said events into user readable messages; and
   vi. a distributor component for distributing said messages to said target addresses in real time.

2. The platform of claim 1, wherein said data pump layer includes:
   a. at least one loader driver for loading static data from external data sources; and
   b. at least one listener adaptor for capturing external messages from a plurality of messaging systems.

3. The platform of claim 1, wherein said MDPDS component is a multi dimensional data structure that holds a minimal set of data necessary to solve pre-defined integrated analytical rules, said data includes:
   a) dimensions, for holding descriptive information about analysis dimensions; and
   b) parameters, for holding a plurality of accumulative data types for analyzing said data.

4. The platform of claim 1, wherein said matcher component includes a matching engine, said matching engine:
   I. categorizes said data into small hierarchical communities, for matching data to targets in heterogeneous communities; and
   II. categorizes said data into dimension based communities, for matching data to targets in homogeneous communities.

5. The platform of claim 1, wherein said distributor component furthermore:
   I) transforms events into human readable messages; and
   II) distributes said events to at least one target address, using a plurality of communications mediums.

6. A method of matching patterns in data to pre-defined events, and delivering actionable messages of these events to at least one relevant target in real time, comprising the steps of:
   i. defining key events to be detected within a data environment, according to user determined rules;
   ii. detecting relevant records from at least one external data source, and discarding irrelevant records;
   iii. analyzing said relevant records;
   iv. recognizing impact of said records according to said definitions of key events, in order to match said records to at least one target address; and
   v. targeting significant said matches, by distributing said events as messages to said at least one relevant recipient, using a plurality of communications mediums.

7. The method of claim 6, wherein said detecting further comprises:
   i- loading static data from batch data sources, by a loader driver; and
   ii- capturing dynamic data from messaging systems/on-line sources, by a listener adaptor.

8. The method of claim 6, wherein said analyzing further comprises:
   i) monitoring values of said records;
   ii) routing each said record according to relevant parameters; and
   iii) where necessary, changing value of said record.

9. The method of claim 6, wherein said recognizing further comprises:
   I. evaluating said data in terms of monitored values;
   II. evaluating said data in terms of additional attributes of the dimensions involved;
   III. evaluating said data in terms of additional information that exists in an information system;
   IV. triggering a distribution function; and
   V. sending a message with said data to at least one relevant target address.

10. The method of claim 6, wherein said targeting further comprises:
    I) comparing the context of each said triggered event with context attributes of each member of a community attached to each said event, by a matching engine; and
    II) turning said event into an action message, by a distribution engine.

11. The method of claim 10, further comprising:
    I- generating at least one short message by using at least one pre-defined template;
    II- sending said at least one message to relevant recipients using a communications medium selected from the group of mediums consisting of E-mail, SMS, Fax, instant messaging, Database Transactions, etc.
    III- generating reports containing tabular enriched information using templates;
    IV- creating triggers for message distribution functions; and
    V- distributing said message to at least one recipient.

12. The method of claim 6, where said parameters are used for a plurality of rules.

13. The method of claim 6, wherein said targeting uses context sensitive routing.

* * * * *